Dec. 2, 1958  G. W. MERRITT  2,862,688
ROTARY FLUID MOTOR DRIVEN CAR-SHIFTING APPARATUS
Filed Feb. 16, 1953  3 Sheets-Sheet 1
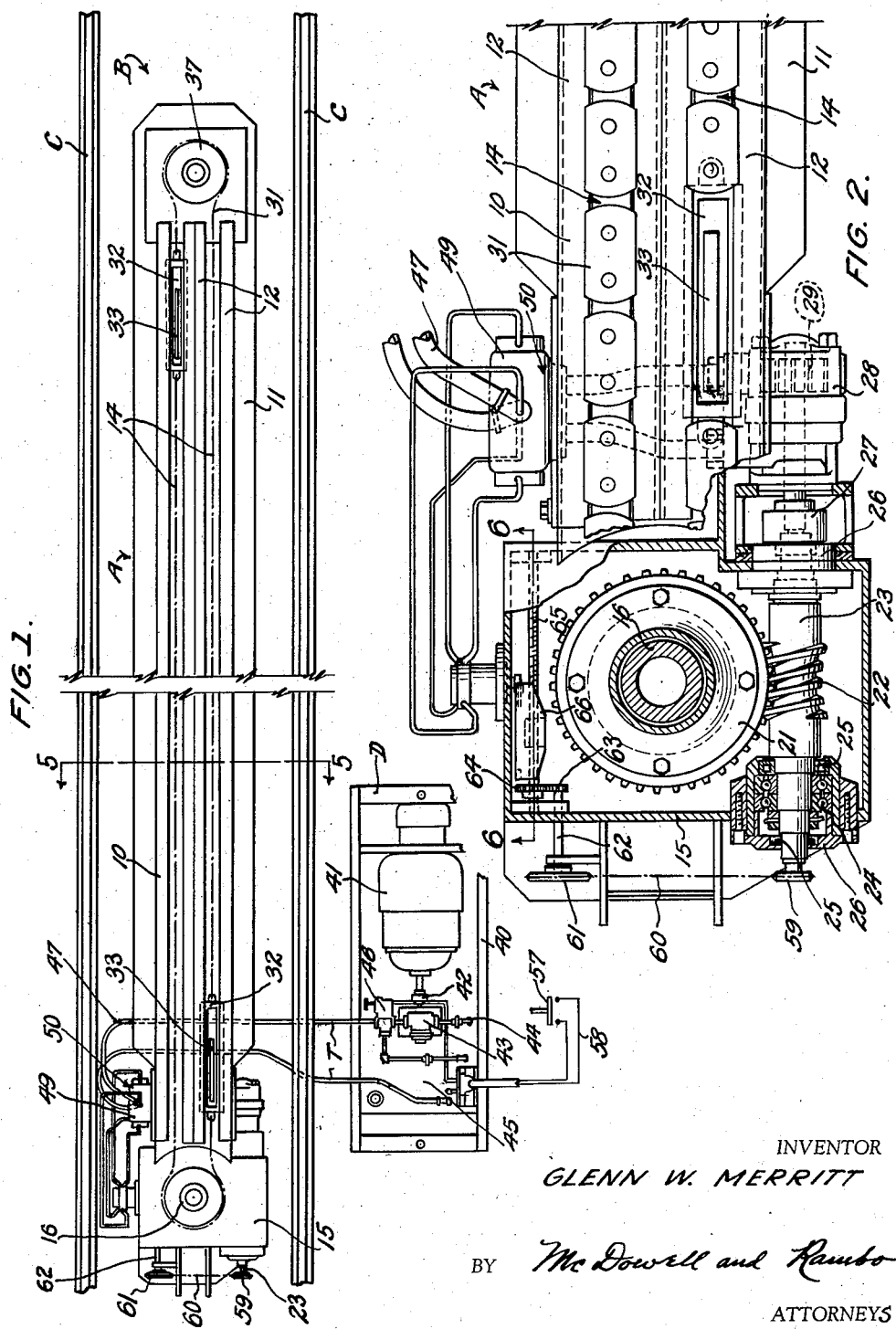
INVENTOR
GLENN W. MERRITT
BY McDowell and Rambo
ATTORNEYS Dec. 2, 1958 G. W. MERRITT 2,862,688
ROTARY FLUID MOTOR DRIVEN CAR-SHIFTING APPARATUS
Filed Feb. 16, 1953 3 Sheets-Sheet 2
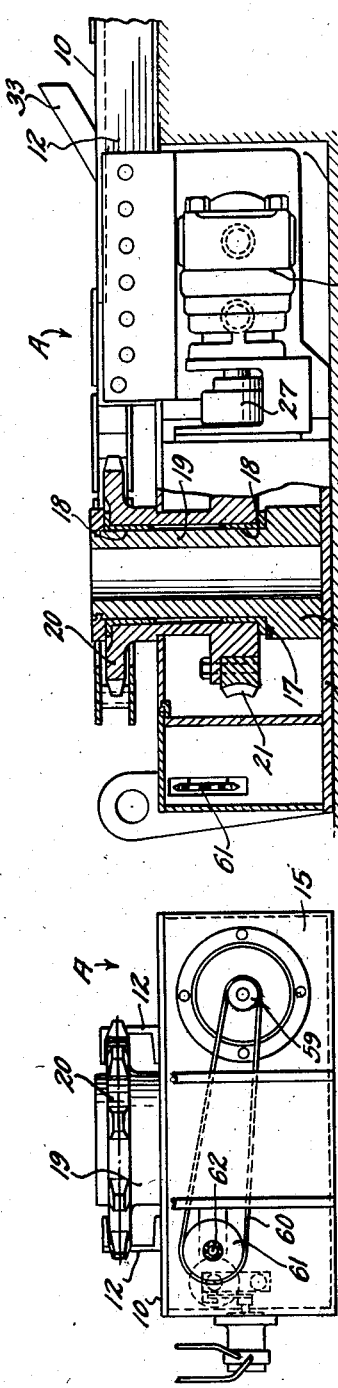
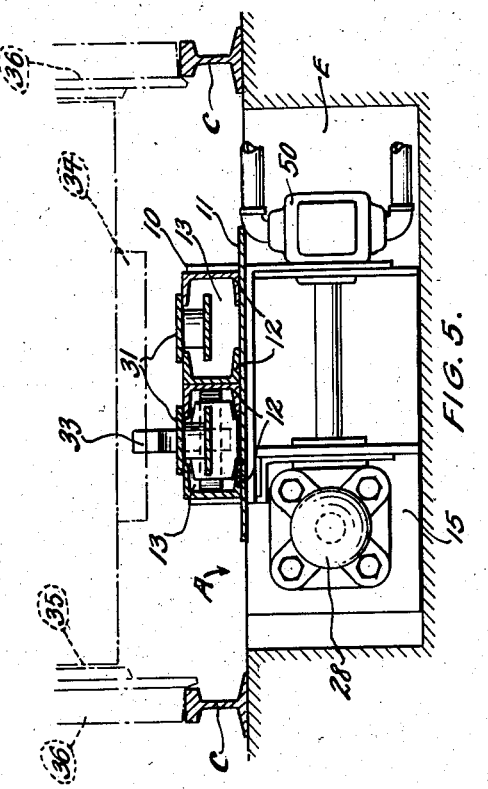
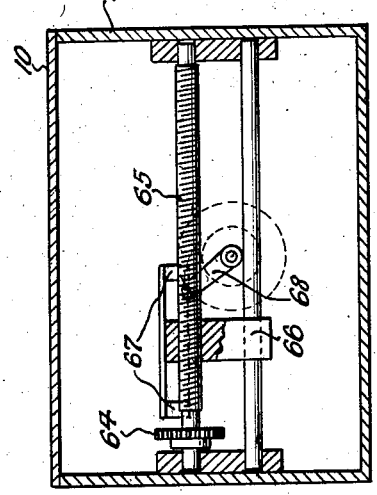
INVENTOR
GLENN W. MERRITT
BY McDowell and Rambo
ATTORNEYS

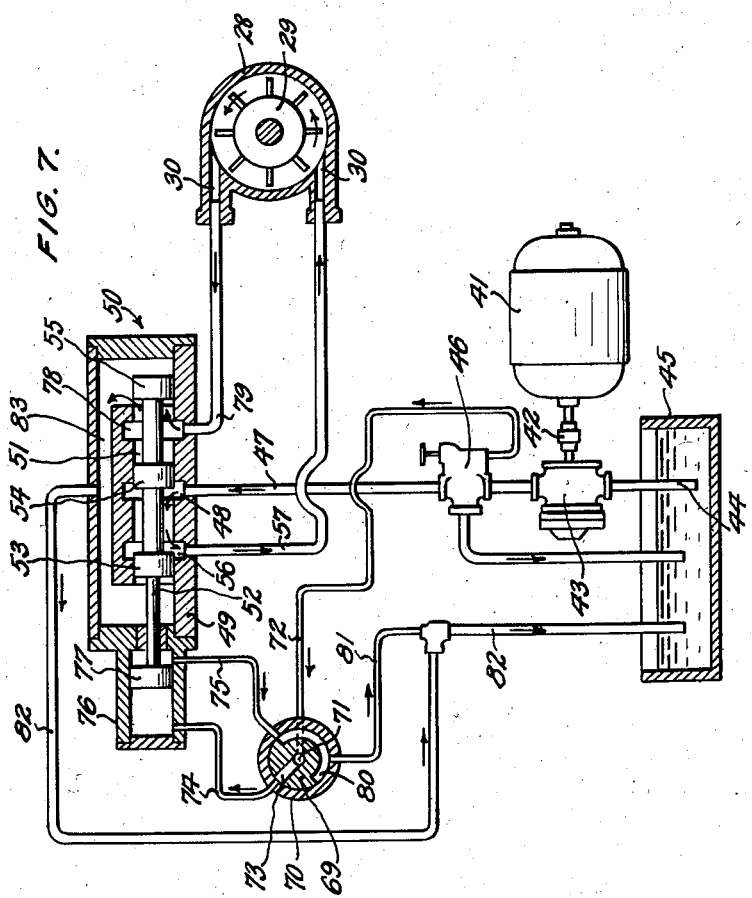

United States Patent Office 2,862,688
Patented Dec. 2, 1958

2,862,688

ROTARY FLUID MOTOR DRIVEN CAR-SHIFTING APPARATUS

Glenn W. Merritt, Bowerston, Ohio, assignor to The Nolan Company, Bowerston, Ohio, a corporation of Ohio Application February 16, 1953, Serial No. 337,205

4 Claims. (Cl. 253—97)

This invention has reference to apparatus employed in moving or shifting wheeled cars for limited distances over trackways. In its more specific aspects, the present invention is concerned with an improved car-shifting apparatus adapted for use in mineral mining, and other industries, under conditions where trips or trains of coupled track-mounted cars are moved over a trackway so that the cars are brought successively into loading registration with the discharge ends of conveyors or other material transferring and advancing means, whereby to fill the cars with the handled materials in a sytematic, rapid, and economical manner.

The present invention provides an improvement upon the car-feeding or shifting mechanism disclosed in my prior application Serial Number 83,582, filed March 26, 1949, now Patent No. 2,642,006, issued June 16, 1953. In my aforesaid earlier application, the feeder mechanism set forth therein comprises a track-mounted unit embodying a base frame which is adapted to be placed flatly on the bed of a trackway between the rails thereof. Mounted on the frame are guides in which are supported an endless belt or chain, the latter carrying a plurality of upstanding, pivotally movable, car-engaging dogs. In order to impart power to the chain or endless belt, use is made of a separate power unit from the track-mounted car-shifting unit. The power unit carries a reversible electric motor which operates suitable transmission gearing involving a rotary driven member. From this member, a transversely extending drive shaft, provided with universal joints in compensating for variations in alignment of the motor shaft with that of the conveyor drive, extends to the gearing on the drive sprocket or element for the endless belt or chain of the track unit, thereby providing a strictly mechanical power-imparting union between the power and track units of the apparatus.

Practice has disclosed that the use of this mechanical drive mechanism between the power-furnishing unit, arranged at the side of a trackway, and the car-shifting unit, mounted on the bed of a trackway between the rails thereof and beneath the rolling stock passing thereover, provides apparatus which is often difficult to mount and arrange in operative order. Again, in such apparatus, the transverse drive shaft connection provided between the power and car-shifting units offers an obstruction to free movement of mine workers around the apparatus and over which the workers may stumble and incur physical injury.

Accordingly, it is a primary object of the present invention to provide car-feeding or shifting apparatus of the character set forth involving separate power and car-feeding units, and wherein flexible tube or conduit connections are provided in transmitting fluid power from the power-furnishing unit to the car-shifting unit, whereby to impart conveniently driving movement to the dog-carrying endless belt of the feeding unit without requiring the formation or use of floor pits in receiving the apparatus.

Another object of the invention is to provide a car-feeding unit in which an endless belt carrying car-advancing dogs is provided, and wherein the endless belt is driven by a sprocket, or other drive member, which is actuated by motion-transmitting gearing driven by a reversible fluid-actuated turbine-type motor, the latter being mounted on the base frame of the track-mounted car-shifting unit.

A further object is to provide a car-shifting unit in which the direction of rotation of the turbine motor and the belt sprocket driven thereby is controlled by reversing the paths of fluid entry and discharge leading to and from the turbine motor.

A still further object is to provide apparatus of this character wherein the reversal of the turbine motor and dog-carrying endless belt driven thereby is accomplished by a novel distributing valve mechanism containing a sliding, pressure-balanced, spool-type valve member, the latter being so formed and arranged with respect to associated fluid passages and chambers formed in the casing of the valve mechanism that when the valve member occupies one of its operating positions, fluid flow into the turbine motor will produce rotation of the latter in one direction, and, when the valve member is actuated to occupy a second operating position, the direction of fluid travel through the motor will be opposite to that which exists when the valve member occupies its first-defined position, whereby to obtain reversal in the operation of said motor and car-shifting means actuated thereby.

Other objects of the invention are: to provide piston means responsive to fluid pressure for producing sliding movement of the distributor valve member in producing reversal in the direction of rotation of the associated turbine motor; to provide a rotary pilot valve for governing the direction of reciprocation of the piston means of the distributing valve; and to provide means for operating the pilot valve in which a runner member, mounted for back and forth movement on a rotary screw shaft driven by the turbine motor, functions at the end of its movement on the screw shaft to actuate the pilot valve in a manner producing operation of the distributor valve mechanism to cause reversal in the direction of rotation of the power shaft or rotor of the turbine motor.

Additional objects are: to provide a feeder unit in which the flat base frame thereof is formed with separately and longitudinally extending channel members defining spaced, parallel, longitudinally extending guides adapted for the reception of an endless belt carrying slidable dog carriers, the latter being so joined with the belt as to be moved longitudinally in either direction on the base frame by fluid-actuated motor means also mounted on the frame of the feeder unit; to provide the carriers with pivoted dog members arranged to project upwardly for engagement with stationary parts of a car, whereby to advance the cars in unison over a trackway in connection with the movement of the dogs and carriers; to provide fluid-transmitting, floor-supported conduits for operatively uniting the power-furnishing and track units; and to provide portable, readily transferable, car-shifting apparatus of this nature which is so formed as to constitute generally an improvement upon prior apparatus adapted for the uses and purposes herein generally set forth.

With these and other objects in view, as will be evident from the following description, the invention accordingly consists of the novel features of construction, combinations of elements, and arrangements of parts hereinafter more fully described and pointed out in the appended claims.

In the drawings:

Fig. 1 is a top plan view disclosing the power and car-shifting units employed by the present invention, and illustrating the operative positions of said units with respect to an associated trackway;

Fig. 2 is an enlarged top plan view, partly in horizontal section, disclosing the drive sprocket end of the car-shifting unit; in this figure, the drive sprocket itself has been omitted in order to disclose underlying structure;

Fig. 3 is an end elevational view of the car-shifting or feeder unit, looking toward the drive sprocket end thereof;

Fig. 4 is a view partly in side elevation and partly in vertical longitudinal section, disclosing the drive sprocket of the car-feeding unit and the associated fluid driven, motor-transmitting gearing therefor;

Fig. 5 is a vertical transverse sectional view taken through the car-feeding or shifting unit on the plane indicated by the line 5—5 of Fig. 1;

Fig. 6 is a detail vertical longitudinal sectional view taken through the drive sprocket end of the feeder unit on the plane indicated by the line 6—6 of Fig. 2; in this figure, there has been illustrated, partly in side elevation and partly in vertical section, the screw shaft-actuated runner member utilized for reversing the direction of rotation of the turbine motor;

Fig. 7 is a diagrammatic view disclosing the hydraulic circuit employed in the mechanism of the present invention.

Referring more particularly to the drawings, my improved car-feeding or shifting mechanism comprises a track-positioned car-feeding unit A. The latter is adapted to be placed flatly on the bed of a trackway B between the rails C thereof, so that the feeder unit extends parallel with the rails and longitudinally of the trackway.

In association with the feeder unit, there is employed a separate power-furnishing unit D, the latter being adapted to be positioned on the floor or bed of a mine at one side of the trackway B. The purpose of the power unit is to develop fluid energy necessary to effect the operation of the feeder unit A. By providing these two units, the apparatus is rendered readily portable, and may be shifted from one working location in a mine to another in a quick and readily executed manner and without requiring any special degree of preparation of the trackway in adapting the same to receive the apparatus. In this connection, it is necessary only to form a small pit or other excavation, such as that indicated at E in Fig. 5 of the drawings, in which the power-actuated drive mechanism of the present invention is adapted to be placed. The pit is comparatively shallow and of small dimensions, so that it may be quickly and readily formed.

The feeder unit A comprises, in this instance, a base frame 10 composed in part of a flat plate 11. Mounted on this plate and extending longitudinally thereof are stationary guide-forming channel members 12, the latter being placed so that they form parallel guides 13 which extend longitudinally of the base frame in transversely spaced, parallel relationship. The channel members are so placed that the upper surfaces thereof produce longitudinally extending, parallel slots 14.

As shown more particularly in Fig. 4, the plate 11, at one end of the feeder unit, is provided with a depending boxing 15 which is adapted to occupy the pit E. Mounted on the bottom wall of this boxing is a stationary, upstanding, tubular stud 16. The latter is shouldered, as at 17, to receive bearing sleeves 18, and rotatable on these sleeves is the hub 19 of a drive sprocket 20, the lower end of the hub carrying a worm gear 21.

Meshing with the teeth of the gear 21 are the threads of a worm 22, the latter being carried by a longitudinally extending shaft 23, shown in Fig. 2, which has its ends rotatably supported in antifriction bearings 24, protected by dirt-excluding packings 25, the latter being carried by cages 26 which form a part of the boxing construction 15.

One end of the shaft 23 is joined by means of a coupling, shown at 27, with the rotor shaft of a fluid-actuated turbine motor 28. This motor is suitably supported in connection with the outer walls of the boxing 15, and includes in the construction exemplified an internal chamber in which is revolubly mounted a rotor 29. Leading to the rotor chamber are fluid passages, shown at 30 in Fig. 7.

By the transmission of fluid under pressure to the rotor chamber through one of the passages 30, rotation is imparted to the rotor 29, producing corresponding revolution on the part of the worm gear shaft 23. Through the worm 22 and the worm gear 21, drive movement is imparted to the sprocket 20.

Passing around the teeth of the sprocket 20 is an endless chain 31, the latter being composed of strong, articulately united metallic links. In this instance, the links are disposed in part in the slots 14 of the channel members 12 in order to be guided in their movements by said channel members. Connected with the chain 31 to form a part thereof are dog carriers 32. In this instance, one of the carriers 32 is arranged in each of the channel guides 13, as shown in Fig. 1. Each of the carriers includes, as shown more particularly in Figs. 4 and 5, a pivotally upstanding dog 33 which is adapted to engage a bracket, sill, frame member, or other relatively stationary part 34 of each of the trip cars shown at 35. The cars are equipped, as usual, with wheels 36 arranged for movement over the trackway rails C. At the forward end of the base frame 10, there is mounted an idler or guide sprocket 37 around the toothed periphery of which the chain 31 passes.

Through mechanism to be presently described, the chain or endless belt 31 is reciprocated first in one direction and then the other, a feature produced by reversing the direction of rotation of the driving mechanism employed in imparting rotary power to the drive sprocket 20. Normally, this reversal takes place after one of the dogs 33 has traveled a complete stroke as measured by substantially the full length of one of the guides 13. Such movement usually is sufficient to move a mine car, or the like, through a linear distance substantially equal to one-half of the total length of the car. It will be noted that when one of the dogs 33 is advancing on its car-shifting stroke, the other of the dogs will be idly returning to an initial starting position. When this starting position is reached, the automatic reversing mechanism of the present invention operates to reverse the direction of movement of said retreating dog and cause it to move on its forward or car-advancing stroke, returning the other of the dogs to its initial starting position. It will be appreciated that as many dogs may be used in the chain as may be necessary in adapting the latter to meet varying car lengths. When the cars are of equal length, the two dogs disclosed carry out the ends of the present invention.

The power unit D, which is adapted to be mounted at the side of the trackway, has been shown as comprising a frame 40 on which is mounted an electric motor 41, or other suitable prime mover. In this instance, the shaft or the motor 41 is coupled, as at 42, with the shaft of a rotary pump, or its equivalent, 43. This pump is provided with an inlet 44 which extends below the surface of a body of liquid contained in a tank or reservoir 45. The discharge side of the pump 43 leads to a pressure relief valve 46. From the valve 46, a pipeline 47 conducts fluid, under pressure supplied by the pump 43, to an annular chamber 48 formed in the casing 49 of a distributor valve 50.

Extending longitudinally through this valve is a valve chamber 51, and positioned for sliding movement in this chamber is a pressure-balanced, spool-type valve member 52. In this instance, the valve member is provided with heads, indicated at 53, 54, and 55, the latter being relatively spaced and formed with uniting body portions of reduced diameter, forming passages providing for the movement of fluid through the chamber 51.

In this instance, and as shown in Fig. 7, fluid enters the chamber 51 through the communicating chamber 48, since the head of the valve member is located substantially to the right of the chamber 48, allowing the latter to communicate openly with the chamber 51 between the heads 53 and 54. Thus, fluid, as indicated by the arrows, may travel through the chamber 51 and find exit from the distributor valve by way of an annular chamber 56. The chamber 56 communicates with a pipeline 57 which extends to the inlet side 30 of the turbine motor 28. The movement of fluid under pressure, with the parts of the distributor valve shown in the positions which they occupy in Fig. 7, produces rotation of the rotor of the motor 28, as shown by the arrows, thus driving the worm gearing 21 and 22 to cause rotation of the drive sprocket 20 in a given direction, and moving one or the other of the dogs on the endless belt 31 in a car-advancing direction.

In order to reverse this direction of movement of the chain or endless belt 31 in an automatic manner, once the operation of the apparatus has been initiated through the closing of the switch 57 in the operating circuit 58 of the motor 41, one end of the shaft 23 is equipped with a sprocket, shown at 59 in Fig. 2. Passing around the sprocket 59 is an endless chain 60 which leads to a registering sprocket 61 mounted on a short shaft 62 which is journaled in connection with the boxing 15. The inner end of the shaft 62 carries a gear 63 which meshes with a similar spur gear 64. The latter is fixed on one end of a screw shaft 65 which is rotatably journaled in suitable bearings within the boxing 15. As shown in Fig. 6, the screw shaft carries a nonrotatable and slidable runner member 66 which moves first in one direction lengthwise of the shaft 65, and then in the opposite direction, the reversal in the direction of movement being obtained through the reversal of the rotor of the turbine motor 28.

As shown in Fig. 6, the runner member 66 is formed at the ends thereof with fingers or depending lugs 67. These lugs are spaced longitudinally and receive between them the outer portion of an operating crank 68, the inner end of said crank being fixed to the axial portion of one end of a rotatable plug 69 mounted in a pilot valve 70.

The plug 69 is formed with an axial passage 71 which communicates with one end of a pipeline 72, the line 72 extending to the pressure discharge side of the normally closed and spring-loaded relief valve 46. The plug 69 includes a radially extending port 73 which is in communication with the axial, longitudinally extending passage 71. The port 73 is adapted to be registered selectively with pipelines 74 and 75 which extend from the shell of the valve 70 to a cylinder 76 provided on one end of the distributor valve 50. Received in the cylinder 76 is a piston 77 which is connected with a reduced outer end or stem of the valve 52.

It will be seen that with the parts of the apparatus disposed in the positions illustrated in Fig. 7, fluid under pressure from the valve 46 enters the passage 71 of the valve plug 69 by way of the pipeline 72. From the passage 71, the fluid passes under pressure through the radial port 73 and thence into the pipeline 74, flowing from the latter into the interior of the cylinder 76 where the pressure builds up against one side of the piston 77, forcing the latter forwardly so that the spool valve 52 maintains the position illustrated in Fig. 7. When the spool valve is so positioned, the main body of fluid passes through the pipeline 47 from the pump 43 and then into the pipeline 57 after traveling through the distributor valve 60, as previously described.

When the desired stroke of the apparatus has been obtained with the parts shown in the position of Fig. 7, the runner member on the screw shaft 65 will have been moved sufficiently to actuate the crank 68 of the pilot valve 70, whereby to cause the port 73 to be moved into registration with the pipeline 75. This action reverses the direction of movement of the piston 77 and causes the pipeline 47 to communicate with a third annular chamber 78 within the valve 50, the chamber 78 being in communication with the turbine motor 28 by way of the pipeline shown at 79, whereby to reverse the direction of flow of the operating fluid through the turbine motor and thereby secure reversal in the direction of movement of the dog-carrying endless belt of the feeder unit A.

The plug 69 of the pilot valve is formed with an arcuate passage 80 which is adapted to communicate with one or the other of the pipes 74 and 75 in order to provide a fluid bleed or vent for fluid displaced from the cylinder 76. This displaced fluid passes by way of a drain pipeline 81 to the return pipe 82 of the fluid system which leads back to the reservoir 45. It will also be noted that the pipeline 82 communicates with an outer chamber 83 formed in the housing of the distributor valve 50. With the parts of the apparatus positioned as shown in Fig. 7, fluid employed in operating the turbine motor 28 is discharged through the pipeline 79 and enters the chamber 78. Due to the position of the head 55 of the valve, fluid passes from the chamber 78 into the outer chamber 83, and thence through the pipeline 82 back to the reservoir 45. Also, due to the position of the valve head 55, this same operation holds true when the direction of fluid flow is reversed and pipe 79 is employed as the fluid supply pipe for the turbine motor rather than the pressure return pipe. Due to the braking action of the worm gear 21 and worm 22, employed as power-transmitting elements between the rotor shaft of the turbine motor 28 and sprocket 20, lost motion or drift on the part of the chain or belt 31 during lag intervals in the reversing of the direction of rotation of the rotor 29 is precluded or of a negligible degree. Any suitable means may be employed in retaining the apparatus in a stationary position of operation, such as the arrangement of the boxing 15 in the pit E.

In view of the foregoing, it will be evident that the present invention provides a car-feeding or shifting mechanism involving a feeder unit having an endless belt carrying a plurality of car-engaging dogs, and wherein the belt is driven by a rotary fluid motor mounted directly on the frame of the apparatus. By the employment of this rotary-type fluid motor, a simple and efficient drive mechanism is provided which eliminates the mechanical shafting employed in previous types of car feeders of this nature. By utilizing the fluid drive mechanism, lengths of flexible tubing, indicated at T in the drawings, may be used in uniting the two units of the apparatus. This flexible tubing may be readily passed beneath the rails of a trackway and placed on the floor of a mine so that it will not interfere with the movements of mine operatives about the apparatus. Further, the flexible tubing connections may be quickly joined in their operative positions, thus eliminating the employment of rigid pipes between the units. The apparatus is under the manual control of the motor switch 57 which control the operation of the motor circuit 58. However, after operation has been initiated, the apparatus functions automatically and without the necessity of further manual control, except to stop its operation when required.

I claim:

1. Fluid-actuated drive means comprising: a reversible turbine motor having a power shaft; a rotatable driving member driven by said shaft; supply means for a working fluid under pressure; automatic means controlling directionally the delivery of said fluid to the motor in reversing its operation, said means including a position-shiftable distributor valve; pipe means leading from said supply means through the distributor valve to said motor for advancing and returning said fluid simultaneously between said motor and supply means in direction governed by the operative positions of the valve; a movable pilot valve for shifting the positions of said distributor valve by application of unbalanced fluid pressures thereto; and means operative upon determinate rotation of said driving member in a given direction to produce operation of said pilot valve causing the distribution valve to reverse the direction of flow of said fluid through said motor and its associated pipe means and thereby the direction of rotation of said driving member.

2. Fluid-actuated drive means comprising: a reversible turbine motor; a driving member mounted for rotation in opposite directions in unison with and by power derived from said motor; supply means for a working fluid under pressure; dual pipe means leading from said supply means to said motor for advancing and returning said fluid simultaneously between the same; a slidable distributor valve disposed in said pipe means, said valve being movable in position in response to unbalanced fluid pressure applied to the ends thereof in reversing the direction of fluid flow in the pipe means between the valve and the motor; a movable pilot valve; conduit means uniting said distributor and pilot valves for the passage of the working fluid between the valves; and means operative upon determinate rotation of said driving member in a given direction to operate said pilot valve in causing fluid flow through said conduit means in a manner reversing the unbalanced fluid pressures on the ends of the distributor valve, whereby to shift its operating position in producing reversal in the direction of fluid flow through said pipe means to and from said motor.

3. Fluid-actuated drive means comprising: a fluid driven motor having a housing formed with a rotor chamber; a radially bladed rotor mounted for rotation in opposite directions within said chamber; a shaft joined with said rotor projecting exteriorly of the housing, the latter being formed with peripherally disposed fluid-advancing and returning outlets; supply means for a pressure working fluid having fluid-advancing and returning outlets; pipe means uniting the outlets of said motor with those of said supply means; a distributor valve interposed in said pipe means for reversing the direction of fluid flow through said pipe means from the valve to said motor, said valve including a casing having an internal chamber; a spool valve member slidably mounted for limited movement between the operating positions in the casing chamber, said valve member including spaced heads defining between them fluid-transmitting passages, the walls of said casing including spaced ports joined with said pipe means; a driving member mounted for rotation in opposite directions; motion-transmitting means driven by said rotor shaft for imparting rotary motion to said member; a pilot valve including a turnable element; conduits extending between said distributor and pilot valves and operable when said turnable element occupies one of its working positions to transmit said fluid under pressure to one end of the chamber of the distributing valve to maintain the spool valve therein in a first working position, and when said turnable element occupies another working position, to transmit the pressure fluid to the opposite end of said valve chamber, whereby to maintain the spool valve in a second working position in which the direction of flow of the pressure fluid to the motor through said pipe means is reversed with repect to that which obtains when the spool valve occupies its first position; and means operative automatically upon predetermined rotation of said driving member in a given direction to impart movement to the turnable element of said pilot valve to transfer the same from one operating position to the other.

4. Fluid-actuated drive means comprising: a fluid driven motor having a housing formed with a rotor chamber; a radially bladed rotor mounted for rotation in opposite directions within said chamber; a shaft joined with said rotor projecting exteriorly of the housing, the latter being formed with peripherally disposed fluid-advancing and returning outlets; supply means for a pressure working fluid having fluid-advancing and returning outlets; pipe means uniting the outlets of said motor with those of said supply means; a distributor valve interposed in said pipe means for reversing the direction of fluid flow through said pipe means from the valve to said motor, said valve including a casing having an internal chamber; a spool valve member slidably mounted for limited movement between the operating positions in the casing chamber, said valve member including spaced heads defining between them fluid-transmitting passages, the walls of said casing including spaced ports joined with said pipe means; a driving member mounted for rotation in opposite directions; motion-transmitting means driven by said rotor shaft for imparting rotary motion to said member; a pilot valve including a turnable element; conduits extending between said distributor and pilot valves and operable when said turnable element occupies one of its working positions to transmit said fluid under pressure to one end of the chamber of the distributing valve to maintain the spool valve therein in a first working position, and when said turnable element occupies another working position, to transmit the pressure fluid to the opposite end of said valve chamber, whereby to maintain the spool valve in a second working position in which the direction of flow of the pressure fluid to the motor through said pipe means is reversed with respect to that which obtains when the spool valve occupies its first position; and means operative automatically upon predetermined rotation of said driving member in a given direction to impart movement to the turnable element of said pilot valve to transfer the same from one operating position to the other, said automatic means for imparting turning movement to the element of the pilot valve embodying a rotatably journaled, threaded shaft driven by said motion-transmitting means; a runner member having spaced stops mounted for longitudinal back and forth movement on said shaft in response to reversing of said motor; and an actuating element carried by said turnable element for alternate engagement with the spaced stops of the runner member.

References Cited in the file of this patent

UNITED STATES PATENTS

| | | |
|---|---|---|
| 1,285,822 | Smith | Nov. 26, 1918 |
| 1,835,686 | Allan | Dec. 8, 1931 |
| 1,838,459 | Smith et al. | Dec. 29, 1931 |
| 2,436,406 | Snader | Feb. 24, 1948 |
| 2,627,251 | Sprague | Feb. 3, 1953 |
| 2,642,006 | Merritt et al. | June 16, 1953 |
| 2,642,045 | Potts | June 16, 1953 |
| 2,663,143 | Joy | Dec. 22, 1953 |